(12) United States Patent
Decker

(10) Patent No.: US 9,561,516 B2
(45) Date of Patent: Feb. 7, 2017

(54) LIQUID SPRAYER FOR PLANTS

(71) Applicant: Westly S. Decker, Sparta, MI (US)

(72) Inventor: Westly S. Decker, Sparta, MI (US)

(*) Notice: Subject to any disclaimer, the term of this patent is extended or adjusted under 35 U.S.C. 154(b) by 53 days.

(21) Appl. No.: 14/444,309

(22) Filed: Jul. 28, 2014

(65) Prior Publication Data

US 2016/0023225 A1 Jan. 28, 2016

(51) Int. Cl.
*B05B 7/08* (2006.01)
*B05B 7/24* (2006.01)
*A01M 7/00* (2006.01)
*A01G 25/14* (2006.01)

(52) U.S. Cl.
CPC .......... *B05B 7/2424* (2013.01); *A01M 7/0046* (2013.01); *A01G 25/14* (2013.01); *B05B 7/2408* (2013.01)

(58) Field of Classification Search
CPC ........ B05B 7/08; B05B 7/0807; B05B 7/0815; B05B 15/0431; B05B 12/002
USPC ............ 239/8, 290–300, 310, 311, 318, 423, 433,239/525, 531, 532
See application file for complete search history.

(56) References Cited

U.S. PATENT DOCUMENTS

| | | | | |
|---|---|---|---|---|
| 423,196 A | * | 3/1890 | Waller ................. | A47B 49/002 312/287 |
| 1,346,750 A | * | 7/1920 | Herman ................. | B05B 7/04 239/405 |
| 1,627,117 A | * | 5/1927 | Jarvis ................. | B05B 7/0815 239/297 |
| 1,769,428 A | * | 7/1930 | Gatchet ................. | A01C 23/042 239/317 |
| 1,777,925 A | * | 10/1930 | Kollmann ............. | B05B 7/2437 239/297 |
| 1,822,743 A | * | 9/1931 | Mitchell ............... | B05B 7/2437 239/348 |
| 2,322,296 A | * | 6/1943 | Hunter ................. | B60S 3/044 239/311 |
| 2,610,433 A | * | 9/1952 | Chisholm ........... | A01M 7/0092 222/399 |
| 2,764,452 A | * | 9/1956 | Denton ................. | A01C 23/042 210/289 |
| 3,079,090 A | * | 2/1963 | Decker ................. | B05B 7/0408 239/142 |
| 3,632,046 A | * | 1/1972 | Hengesbach ......... | B05B 7/2443 239/318 |
| 3,635,401 A | * | 1/1972 | Bromley ................. | B05B 5/03 239/705 |
| 3,758,036 A | * | 9/1973 | Bauder ................. | A01M 13/00 239/102.1 |

(Continued)

*Primary Examiner* — Arthur O Hall
*Assistant Examiner* — Joseph A Greenlund
(74) *Attorney, Agent, or Firm* — Gardner, Linn, Burkhart & Flory, LLP

(57) ABSTRACT

The present invention provides a liquid sprayer for plants having a wand with a gas supply tube for providing a flow of a pressurized gas and a liquid supply tube for providing a liquid to be sprayed. A discharge end of the gas supply tube and a discharge end of the liquid supply tube may be arranged so that the pressurized gas through the gas supply tube flows across the discharge end of the liquid supply tube thereby drawing or siphoning the liquid through the liquid supply tube into the flow of the pressurized gas for dispersal. The liquid and pressurized gas combine to create a fine mist or fog that provides a gentler and more even application over the plant surface.

18 Claims, 5 Drawing Sheets

(56) References Cited

U.S. PATENT DOCUMENTS

Figure 1:
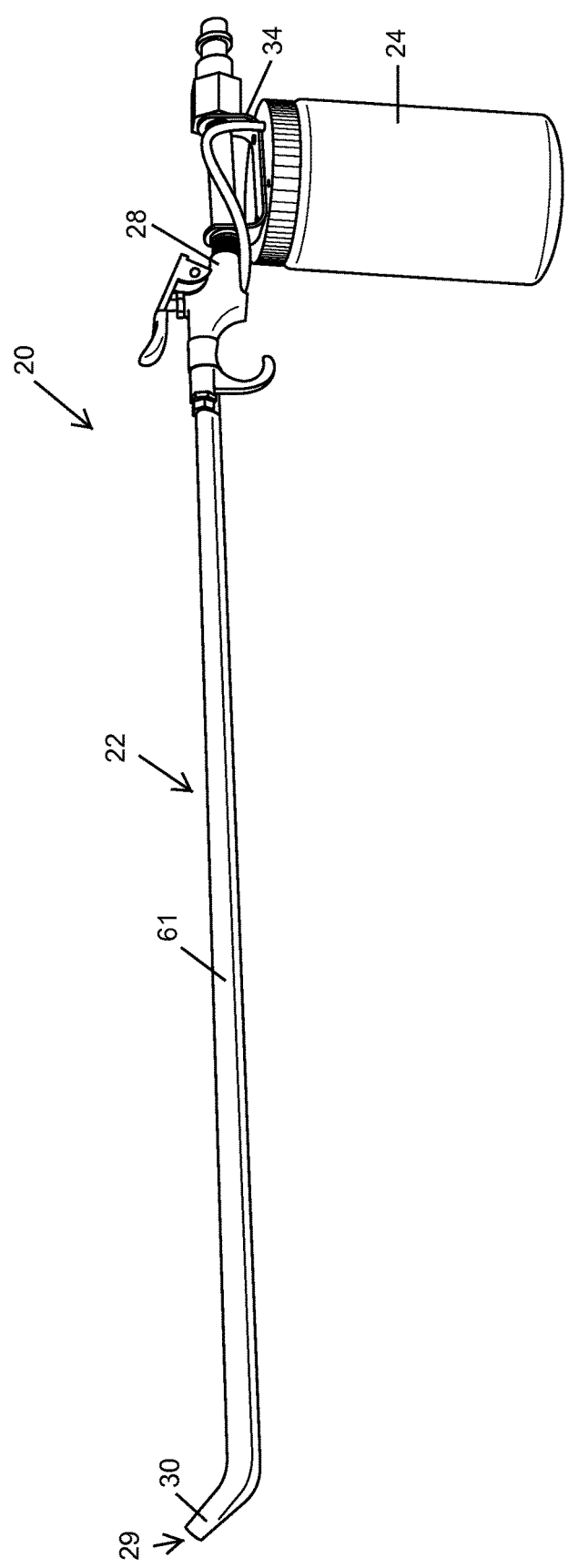

| Patent No. | | Date | Inventor | Classification |
|---|---|---|---|---|
| 4,653,691 A | * | 3/1987 | Grime | B05B 7/02 239/311 |
| 4,899,940 A | * | 2/1990 | Leaver | B60S 3/044 239/526 |
| 4,969,603 A | * | 11/1990 | Norman | B05B 7/2443 239/318 |
| 4,982,896 A | * | 1/1991 | Crow | B05B 1/044 239/11 |
| 5,078,323 A | * | 1/1992 | Frank | B05B 7/1209 239/296 |
| 5,190,217 A | * | 3/1993 | Black | B05B 7/1495 239/154 |
| 5,452,856 A | * | 9/1995 | Pritchard | B05B 7/08 239/297 |
| 5,520,331 A | * | 5/1996 | Wolfe | B05B 7/0475 239/398 |
| 5,669,558 A | * | 9/1997 | Ichel | B05B 1/34 239/311 |
| 5,803,367 A | * | 9/1998 | Heard | B05B 7/0815 239/296 |
| 5,944,911 A | * | 8/1999 | Winters | B05B 1/005 134/37 |
| 5,947,039 A | * | 9/1999 | Lundgren | B25G 1/102 111/7.1 |
| 6,003,787 A | * | 12/1999 | Fisher | A01M 7/0017 239/355 |
| 6,267,300 B1 | * | 7/2001 | Venema | B05B 7/0869 239/290 |
| 6,308,899 B1 | * | 10/2001 | Crofford | B05B 9/0816 239/373 |
| 6,386,293 B1 | * | 5/2002 | Bartlett | A62C 5/02 169/13 |
| 6,409,097 B1 | * | 6/2002 | McCauley | A01M 9/0038 239/289 |
| 6,688,534 B2 | * | 2/2004 | Bretz | F23D 11/107 239/135 |
| 6,837,447 B1 | * | 1/2005 | Clark | A01M 7/0003 239/142 |
| 7,513,444 B1 | * | 4/2009 | Kurimski | E04D 15/07 215/286 |
| 7,641,133 B2 | * | 1/2010 | Wilfert | B08B 3/026 239/310 |
| 7,828,226 B2 | * | 11/2010 | Martin | B05B 15/025 239/104 |
| 8,308,083 B2 | * | 11/2012 | Woodgate | B05B 1/3046 239/296 |
| 8,336,789 B2 | * | 12/2012 | Kuo | B05B 3/022 239/226 |
| 8,640,979 B2 | * | 2/2014 | Wu | B05B 9/0816 239/526 |
| 8,684,282 B2 | * | 4/2014 | Steffen | A61B 17/00491 222/145.5 |
| 8,807,454 B2 | * | 8/2014 | Reitz | B05B 7/0815 239/296 |
| 8,814,062 B2 | * | 8/2014 | Lin | B05B 3/06 239/251 |
| 8,840,593 B2 | * | 9/2014 | Greter | A61B 17/00491 239/310 |
| 8,864,051 B2 | * | 10/2014 | Lin | B05B 3/0409 239/240 |
| 8,960,571 B2 | * | 2/2015 | Haruch | B05B 7/066 239/290 |
| 2002/0117558 A1 | * | 8/2002 | Timmes | B05B 7/2424 239/318 |
| 2003/0127537 A1 | * | 7/2003 | Wang | B05B 7/2445 239/310 |
| 2003/0132312 A1 | * | 7/2003 | Kelly | A01C 23/042 239/310 |
| 2003/0146298 A1 | * | 8/2003 | Jou | B05B 7/2489 239/302 |
| 2004/0118940 A1 | * | 6/2004 | Lavitt | A01G 25/145 239/302 |
| 2005/0145721 A1 | * | 7/2005 | McLaws | G09F 3/00 239/317 |
| 2005/0161532 A1 | * | 7/2005 | Steenkiste | C23C 24/04 239/433 |
| 2006/0071097 A1 | * | 4/2006 | Glauser | B05B 7/1418 239/433 |
| 2008/0251610 A1 | * | 10/2008 | Franks | B05B 7/0416 239/433 |
| 2009/0008473 A1 | * | 1/2009 | Yun | A01M 7/0021 239/85 |
| 2010/0320289 A1 | * | 12/2010 | Kuo | B05B 3/022 239/290 |
| 2011/0089261 A1 | * | 4/2011 | Gohring | B05B 7/2408 239/310 |
| 2012/0100297 A1 | * | 4/2012 | Larson | B05B 7/061 427/372.2 |
| 2013/0008978 A1 | * | 1/2013 | Smith | B05B 7/2435 239/302 |
| 2013/0074864 A1 | * | 3/2013 | Nuzzo | B05B 7/2408 132/212 |
| 2013/0193232 A1 | * | 8/2013 | Dobias | A01M 7/0046 239/308 |
| 2014/0166772 A1 | * | 6/2014 | Gomez | A01M 7/0092 239/8 |
| 2015/0306613 A1 | * | 10/2015 | Parks | B01F 5/0615 239/8 |

* cited by examiner

LIQUID SPRAYER FOR PLANTS

FIELD OF THE INVENTION

The present invention is directed to liquid sprayers and, more particularly, to hand-held liquid sprayers for plants.

BACKGROUND OF THE INVENTION

Plants are vulnerable to attack from insects and disease, which can cause significant damage and economic loss. One common method of protecting plants is to spray their leaves with a liquid pesticide. However, to be most effective, the liquid pesticide should be applied to all exposed surfaces of the plant. This is especially true for contact pesticides, which generally only kill pests as a result of direct contact. Conventional sprayers deliver a heavy volume of spray with such force that outer leaves collapse, thereby leaving the underside of the leaf unsprayed and/or leaving dense inner foliage growing within the outer leaves unsprayed.

SUMMARY OF THE INVENTION

The present invention provides a liquid sprayer for plants in which a liquid to be sprayed enters a stream of pressurized gas creating a fine mist or fog that provides a more even coverage and a gentler application than conventional sprayers using pressurized gas to push or force liquid through a dispersal nozzle. The liquid sprayer includes a wand having a gas supply tube for providing a flow of a pressurized gas and a liquid supply tube for providing a flow of liquid at or near the tip of the wand, such as at or near the discharge end of the gas supply tube. A discharge end of the gas supply tube and a discharge end of the liquid supply tube may be arranged so that the pressurized gas through the gas supply tube flows across the discharge end of the liquid supply tube drawing the liquid through the liquid supply tube into the flow of the pressurized gas. The wand may include an angled spray tip for better directing the output of the sprayer to the desired areas of the plant and an attached tank for holding the liquid to be disbursed. The tank may attach in a way that allows the wand to rotate about a longitudinal axis so that the sprayer tip may be pointed in any direction while keeping the tank in an upright position.

Positioning the liquid supply tube at or near the tip of the wand allows the air to create a siphon to draw liquid through the liquid supply tube, as well as atomizes the liquid and disperses it in a wider fogging pattern. The sprayer may be used to apply a low volume of pressurized air to the plant, thereby creating a fluttering motion of the leaves, helping to lift and separate the leaves, and especially helping to part dense foliage for better access within a multi-layered leafy structure of a compact plant. This aids in providing significantly greater coverage of the dispersed liquid. These and other objects, advantages, purposes and features of the present invention will become more apparent upon review of the following specification in conjunction with the drawings.

BRIEF DESCRIPTION OF THE DRAWINGS

FIG. 1 is a side perspective view of a liquid sprayer in accordance with the present invention;

FIG. 2 is an exploded view of the liquid sprayer of FIG. 1;

FIG. 3 is a side elevation view of the liquid sprayer of FIG. 1, but with the wand rotated 180-degrees so that the tip is angled downward;

FIG. 4 is a partial sectional view of the liquid sprayer of FIG. 1; and

FIG. 5 is a perspective view of the wand tip of the liquid sprayer of FIG. 1.

DESCRIPTION OF THE PREFERRED EMBODIMENTS

The present invention will now be described with reference to the accompanying figures, wherein the numbered elements in the following written description correspond to like-numbered elements in the figures. Referring to the illustrated embodiment of FIGS. 1 and 4, a sprayer 20 used for applying a liquid, such as water, pesticides, nutrients or the like, to the exposed surfaces of a plant includes an elongated wand 22 and a liquid holding tank 24. Wand 22 includes a generally rigid gas supply line or tube 26 connected with a handle 28 at one end and having a tip 30 at the other end. A generally flexible liquid supply line or tube 32 extends from inside tank 24 and protrudes into tip 30 of gas supply tube 26. A pressurized gas, such as compressed air, flows through gas supply tube 26 and out an opening 29 at tip 30. As it does, the pressurized gas flows across a discharge end 66 of the liquid supply tube 32, creating a siphon that draws liquid from tank 24 through liquid supply tube 32 to combine with the outflowing gas. The gas flow rate is such that the mixture of liquid and pressurized gas creates a fine mist or fog, which provides a more even application on the plant surfaces. Wand 22 may attach to tank 24 at handle 28 via a generally U-shaped bracket 34. Bracket 34 allows wand 22 to rotate about a longitudinal axis 36, which permits tip 30 to be aimed in any direction while maintaining tank 24 in a generally upright position.

Referring now to FIG. 2, gas supply tube 26 includes a supply end 38 and a discharge end or tip 30, and is constructed of a generally rigid material such as a metallic or plastic. Supply end 38 attaches to one end of hollow handle 28 via a fastener, such as nut 42. Handle 28 includes gripping portion 27 and a hollow pipe or tube portion forming a shaft or extension member 44. Member 44 has a first threaded end 46 and a second threaded end 48. As discussed in more detail below, member 44 extends through bracket 34 in order to attach tank 24 to handle 28 of wand 22. First end 46 of member 44 threads into gripping portion 27. Second end 48 threads into a standard coupler or quick connect plug or gas fitting 50 for connecting wand 22 to a source of pressurized gas, such as an air compressor. Together gas supply tube 26, handle 28, and gas fitting 50 form a continuous passageway between plug 50 and tip 30 through which pressurized gas can flow, with gas fitting 50 defining an input end of wand 22 into which pressurized gas is delivered, such as via an air compressor as discussed below.

Handle 28 may include a manual control 52, such as a lever, operable to control or regulate the flow of pressurized gas through gas supply tube 26. When an operator presses down on manual control 52, a plunger 53 is pushed into handle 28 opening a valve and allowing pressurized gas to flow through handle 28 and into gas supply tube 26. As discussed in more detail below, tube 26 includes an aperture 54 located substantially near tip 30 for receiving liquid supply tube 32. (See FIGS. 4 and 5). Liquid from tank 24 is drawn into supply tube 32, as discussed below, and is combined with gas flowing through tube 26 creating a mist or fog that is discharged out opening 29. Tube 26 also includes an elbow or bend 56 near tip 30 such that tip 30 is angled relative to the axis defined by the primary elongate shaft of tube 26. Bend 56 allows the discharge from opening 29 to be better aimed or directed to the desired surfaces of the plant.

Figure 2:
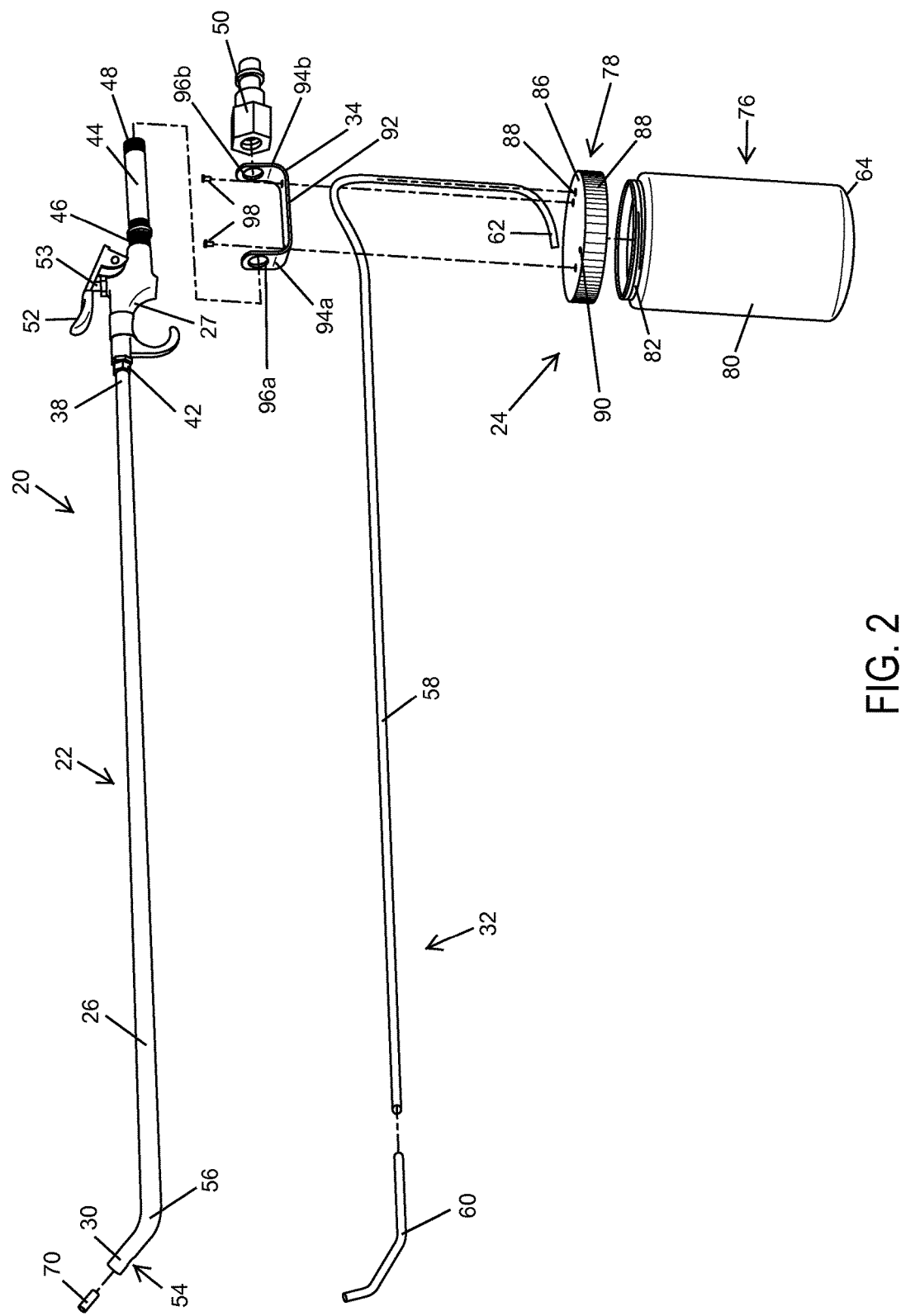
Figure 3:
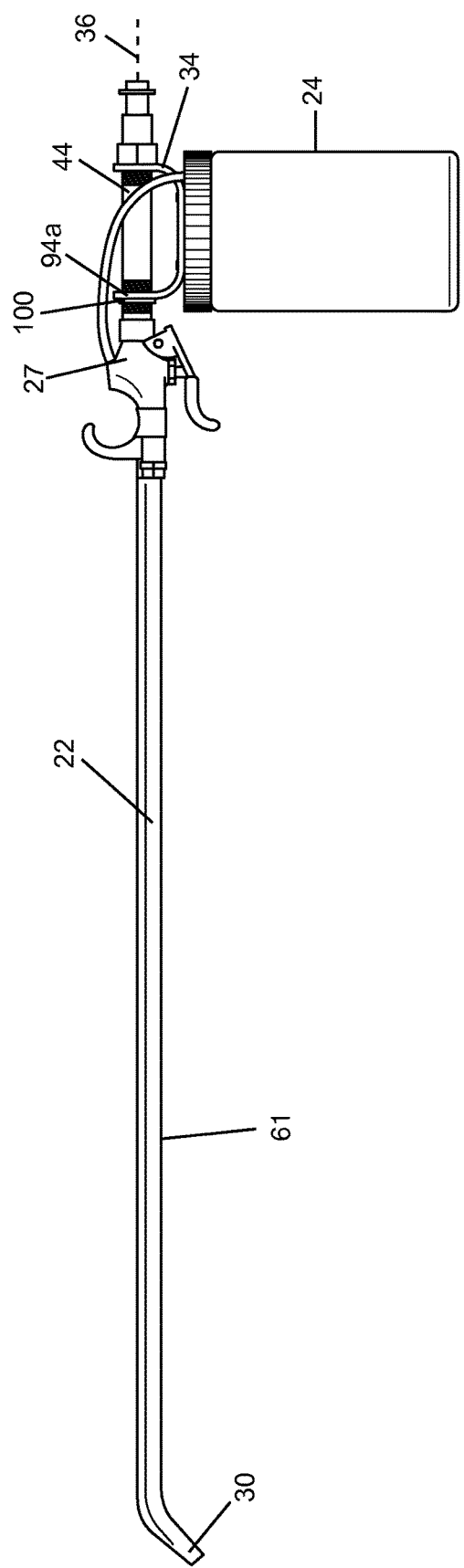
Figure 4:
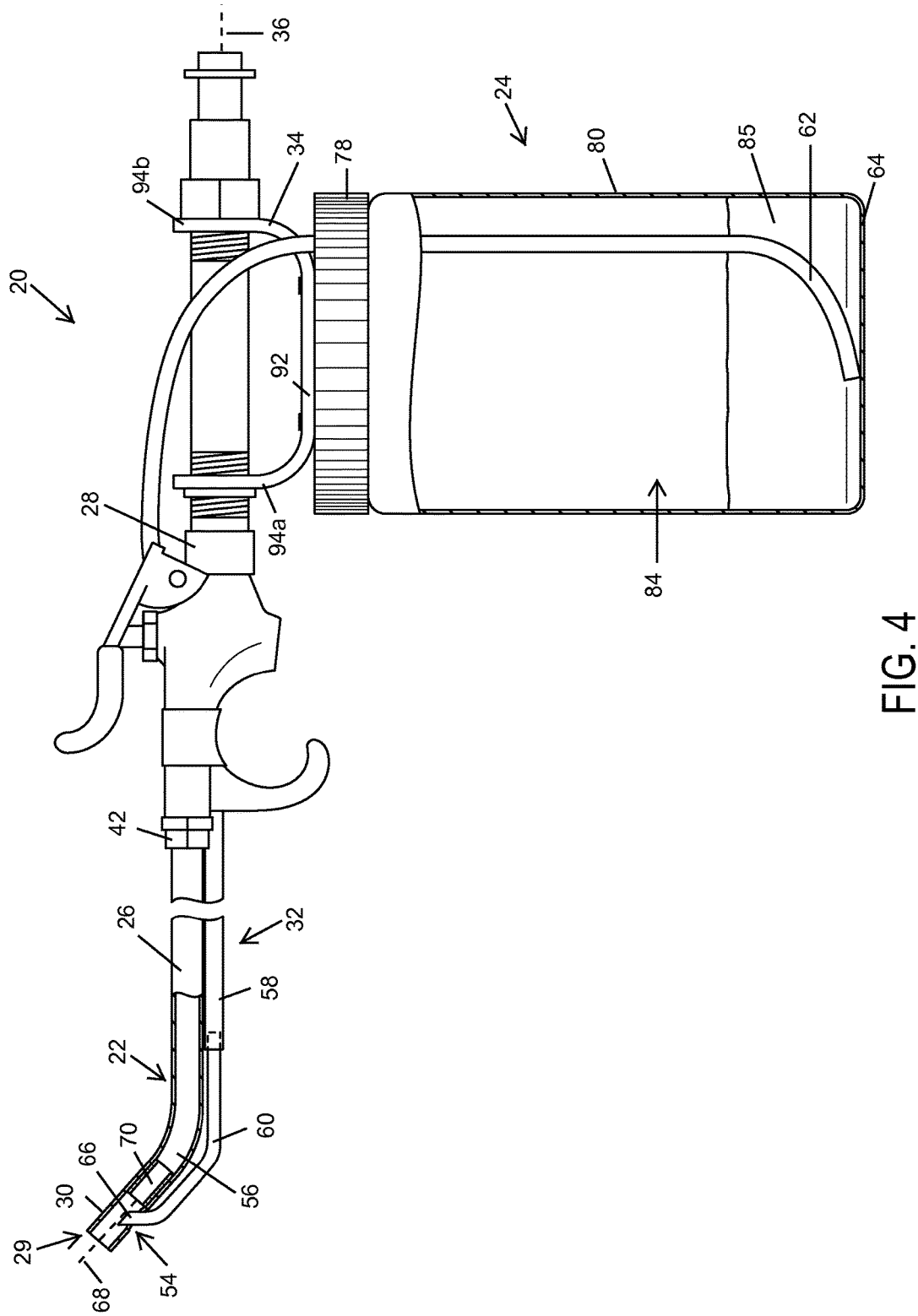

As understood from FIGS. 2 and 4, liquid supply tube 32 extends lengthwise along gas supply tube 26. In the illustrated embodiment, liquid supply tube 32 includes a generally flexible tube portion 58 and a generally rigid tube or nozzle portion 60, with tube portion 58 being constructed of flexible plastic tubing and nozzle portion 60 being constructed of copper tubing. Tube portion 58 allows liquid supply tube 32 to bend as needed to install into tank 24. Flexible tube portion 58 also supports movement of wand 22 relative to tank 24 as discussed in more detail below. Tube portion 60 is rigid so as not to deform under the flow of the pressurized gas in order to provide a more consistent discharge of liquid into the gas stream, but is bendable to enable it to be formed into the illustrated orientation. Rigid tube 60 is also less susceptible to damage or extraction from gas supply tube 26 if wand tip 30 is knocked or bumped. A fastening element 61 such as shrink wrap tubing, tape or the like may be used to secure liquid supply tube 32 to gas supply tube 26 as shown in FIGS. 1 and 3. Element 61 thus forms a sheath like cover disposed around tube 32 and tube 26.

As best shown in FIG. 4, rigid tube 60 and flexible tube 58 are dimensioned such that one end of tube 60 inserts into tube 58, forming a generally leak-tight connection between the two. A supply end 62 of liquid supply tube 32 extends into tank 24 and is of sufficient length to reach a bottom section or portion 64 of tank 24. This allows for a more complete emptying of the contents of tank 24. A discharge end 66 of liquid supply tube 32 protrudes into gas supply tube 26 substantially near tip 30 through aperture 54 (FIG. 5) so that end 66 extends roughly to an axis 68 (FIG. 4) through the center of opening 29. As pressurized gas flows through tube 26 and across discharge end 66 of liquid supply tube 32, a vacuum or siphon is created at discharge end 66, which draws liquid from tank 24 through liquid supply tube 32 into the gas stream. The drawing of liquid into the gas stream occurs generally at the point of dispersion, creating a fine mist or fog that provides a more even coverage of the plant surfaces, which is an advantage over the streams of liquid produced by conventional sprayers that use the pressure of compressed air to force or push the liquid through a dispersion nozzle or that use pressurized gas to redirect a liquid stream.

Figure 5:
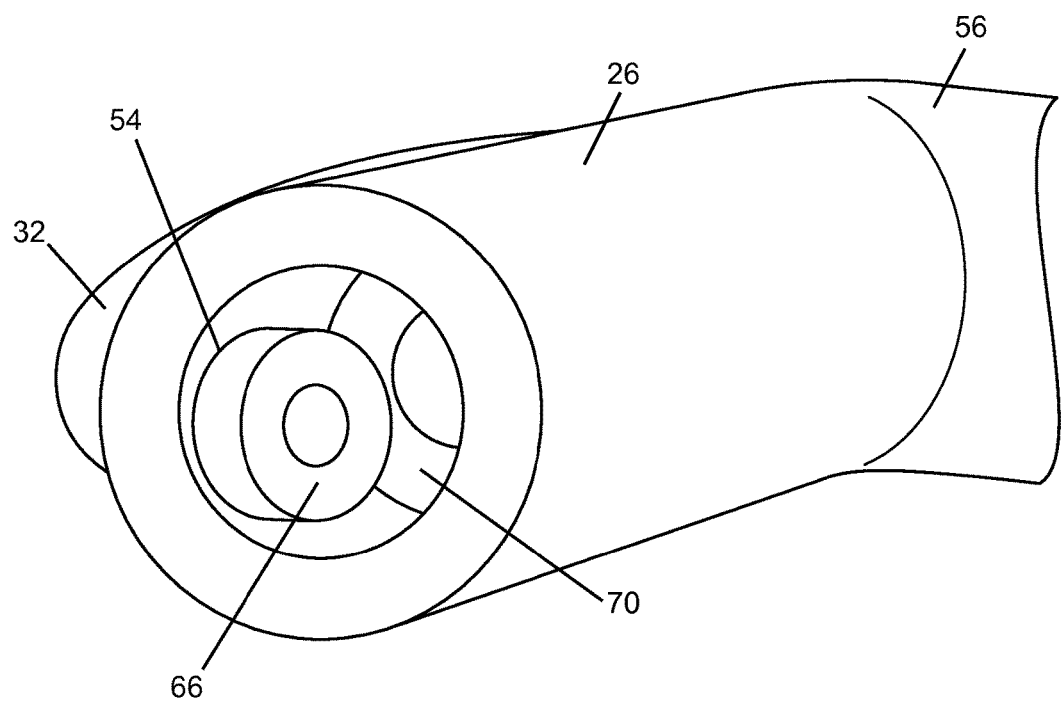

In order to aid in obtaining a desired consistency of liquid-gas mixture, a restrictor tube 70 may be installed between discharge end 66 and bend 56. As best illustrated in FIGS. 4 and 5, restrictor tube 70 helps to direct the flow of pressurized gas across discharge end 66 of liquid supply tube 32. The inner diameter of restrictor tube 70 may be chosen to provide a desired gas flow rate to achieve the desired spray output volume and consistency. The outer diameter of restrictor tube 70 is chosen to form a friction fit with gas supply tube 26. This helps to keep restrictor tube 70 in place within gas supply tube 26 as well as prevents pressurized gas from flowing between restrictor tube 70 and gas supply tube 26 which might interfere with the liquid and gas mixing process. The protruding discharge end 66 of liquid supply tube 32 may also help in inhibiting restrictor tube 70 from exiting gas supply tube 26 under the pressure of the flowing gas while bend 56 inhibits restrictor tube 70 from moving down gas supply tube 26 and away from tip 30.

The liquid being dispersed is held in tank 24 and may include liquids such as water, nutrients, pesticides or the like. As shown in FIGS. 2 and 4, tank 24 comprises a container portion 76 and a lid 78. Container portion 76 comprises bottom portion 64 with a wall or side 80 extending upwards from bottom portion 64 and terminating in a threaded neck 82. Together, bottom element 64 and side 80 define a cavity 84 used to hold a liquid 85 to be sprayed. Removably attached to container portion 76 is lid 78. Lid 78 includes a top element 86 with a wall or side 88 extending downward from top element 86 with internal threads and is configured to thread onto neck 82 of container portion 76. Alternative connections of lid 78 to container portion 76, however, may be employed. Lid 78 includes a through hole 88 dimensioned to receive supply end 62 of liquid supply tube 32. Lid 78 also includes a venting aperture 90. Aperture 90 allows air from the atmosphere to enter tank cavity 84 to replace liquid 85 as it is removed.

In the illustrated embodiment, tank 24 is attached to handle 28 of wand 22 via a generally U-shaped bracket 34 having a base element 92 and a pair of substantially parallel legs 94a and 94b. Extending through each leg 94a, 94b are generally concentric holes 96a and 96b, respectively. Holes 96a, 96b are dimensioned to receive hollow member 44 of wand handle 28. Member 44 inserts through holes 96a, 96b while coupler 50 threads onto second threaded end 48, securing bracket 34 onto member 44. Bracket 34 attaches to lid 78 via a one or more fasteners 98. As shown in FIG. 3, a rubberized ring or washer 100 between leg 94a and gripping portion 27 may be used to limit the movement of tank 24 along member 44. Bracket 34 is configured so that wand 22 is free to rotate 360 degrees about a longitudinal axis 36, which provides improved access to all areas the plant by allowing sprayer tip 30 to be angled downward (as shown in FIG. 3) or upward (as shown in FIG. 1) or any angle in between while keeping tank 24 in its upright position. That is tank 24 is free to rotate about pipe portion 44 as wand is rotated to orient tip 30 in any orientation. For example, tip 30 is shown in FIGS. 1 and 4 in an upward orientation, which can be employed to spray onto the bottom or underside of leaves or foliage. Tip 30 is alternatively shown in FIG. 3 in a downward orientation that may be used to spray the tops of leaves or other plant portions. It should be appreciated that tip 30 may be rotated into any 360 degree orientation relative to tank 24, with tank 24 tending to rotate into the orientation shown in FIGS. 1, 3 and 4 via gravity.

In the illustrated embodiment, gas supply tube 26 is a hollow aluminum cylinder having an approximately 5/16 inch outer diameter and an approximately 3/16 inch inner diameter. Bend 56 in gas supply tube 26 is approximately 1¼ inches from tip 30 and approximately 22½ inches from handle nut 42. Still further, flexible tube portion 58 of liquid supply tube 32 and restrictor tube 70 are constructed from PVC plastic tubing having an approximately 3/16 inch outer diameter and an approximately 3/32 inch inner diameter. Also relative to the illustrated embodiment, rigid tube portion 60 is formed from standard 1/8 inch diameter copper refrigeration tubing. Compressed air, such as from a conventional air compressor delivered through a conventional hose to plug 50, may be used as the pressurized gas supply, with the air being delivered at between approximately 30 to 40 psi in the illustrated embodiment to provide a proper gas flow to disperse the liquid in a mist or fog of the desired consistency. However, other materials, dimensions, and gas pressures could alternatively be used while still being within the scope of the present invention.

Therefore, the present invention provides a liquid sprayer device for plants in which pressurized gas is used to siphon or draw the liquid into the gas stream, creating a fine mist or fog that provides a gentle, more even application over the surface of the plant than conventional sprayers that create a spray of large droplets and streams of liquid by using pressurized air to force or push liquid through a dispersion nozzle. Because the mist provides a more efficient coverage of all the plant surfaces, a lighter application may be applied, reducing the amount of liquid needed, which is especially beneficial in the case of pesticide treatments. A lighter spray is also less damaging to sensitive plants. A pivoting handle and angled tip allow access to the plant from virtually any angle.

Changes and modifications to the specifically described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A liquid sprayer for plants comprising:

a wand comprising a gas supply tube for providing a flow of a pressurized gas and a liquid supply tube for providing a flow of a liquid to be sprayed, said gas supply tube having a discharge end and said liquid supply tube having a supply end and a discharge end, said liquid supply tube being disposed exteriorly of said gas supply tube over a majority of the length of said wand with said discharge end of said liquid supply tube projecting into an aperture of said gas supply tube proximate said discharge end of said gas supply tube, and wherein said gas supply tube includes a tip portion adjacent said discharge end of said gas supply tube and a bend in said gas supply tube adjacent said tip portion whereby said tip portion is angled relative to a longitudinal axis of said wand;

a control operatively connected with said gas supply tube, said control configured to selectively enable or prevent the pressurized gas to flow through said gas supply tube;

a tank connected to said wand, said tank configured to hold the liquid to be sprayed with said supply end of said liquid supply tube configured to be disposed in said tank; and a bracket, wherein said tank is connected to said wand by said bracket with said bracket being rotatable about a longitudinal axis of said wand, and wherein said tank comprises a lid and a container, and wherein said lid is connected to said bracket;

wherein said discharge end of said gas supply tube and said discharge end of said liquid supply tube are arranged so that the pressurized gas that flows through said gas supply tube flows across said discharge end of said liquid supply tube to thereby draw the liquid through said liquid supply tube into the flow of the pressurized gas, and wherein said tank is movably connected to said wand such that said wand is configured to rotate about the longitudinal axis of said wand relative to said tank.

2. The liquid sprayer of claim 1, wherein said wand further comprises a handle attached to said supply end of said gas supply tube, and wherein said handle includes said control.

3. The liquid sprayer of claim 1, wherein said discharge end of said liquid supply tube protrudes into said tip portion of said gas supply tube between said bend and said discharge end of said gas supply tube.

4. The liquid sprayer of claim 1, wherein said liquid supply tube comprises a generally flexible tube portion joined with a generally rigid nozzle portion, said nozzle portion comprising said discharge end of said liquid supply tube, and with said tube portion configured to be disposed in said tank and with said nozzle portion protruding into said gas supply tube.

5. The liquid sprayer of claim 4, wherein said nozzle portion of said liquid supply tube protrudes into said tip portion.

6. The liquid sprayer of claim 1, wherein said liquid supply tube comprises a generally flexible tube portion and a generally rigid nozzle portion, said nozzle portion comprising said discharge end of said liquid supply tube, with said tube portion configured to be disposed in said tank and with said nozzle portion arranged so that the pressurized gas that flows through said gas supply tube flows across said discharge end of said nozzle portion.

7. The liquid sprayer of claim 1, further comprising a coupler attached to said wand and configured to connect to an airline of an air compressor for supplying the pressurized gas to said gas supply tube.

8. A liquid sprayer for plants comprising:

a wand comprising a gas supply tube for providing a flow of a pressurized gas and a liquid supply tube for providing a flow of a liquid to be sprayed, said gas supply tube having a discharge end and said liquid supply tube having a supply end and a discharge end, said liquid supply tube being disposed exteriorly of said gas supply tube over a majority of the length of said wand with said discharge end of said liquid supply tube projecting into an aperture of said gas supply tube proximate said discharge end of said gas supply tube, and wherein said gas supply tube includes a tip portion adjacent said discharge end of said gas supply tube and a bend in said gas supply tube adjacent said tip portion whereby said tip portion is angled relative to a longitudinal axis of said wand, wherein said discharge end of said liquid supply tube protrudes into said tip portion of said gas supply tube;

a handle attached to said supply end of said gas supply tube, wherein said handle includes a control operatively connected with said gas supply tube with said control configured to selectively enable or prevent the pressurized gas to flow through said gas supply tube;

a tank connected to said wand, said tank configured to hold the liquid to be sprayed with said supply end of said liquid supply tube configured to be disposed in said tank, said tank being movably connected to said wand such that said wand is configured to rotate about a longitudinal axis of said wand relative to said tank;

a bracket, wherein said tank is connected to said wand by said bracket with said bracket being rotatable about a longitudinal axis of said wand, wherein said tank comprises a lid and a container, and wherein said lid is connected to said bracket; and an extension member connected to said handle opposite from said gas supply tube, and wherein said bracket is connected to said extension member;

wherein said discharge end of said gas supply tube and said discharge end of said liquid supply tube are arranged so that the pressurized gas that flows through said gas supply tube flows across said discharge end of said liquid supply tube to thereby draw the liquid through said liquid supply tube into the flow of the pressurized gas.

9. The liquid sprayer of claim 8, further comprising a coupler attached to said extension member opposite said handle, said coupler being configured to be connected to an airline of an air compressor for supplying pressurized gas to said gas supply line.

10. The liquid sprayer of claim 8, wherein said discharge end of said liquid supply tube protrudes into said gas supply tube substantially near said discharge end of said gas supply tube.

11. The liquid sprayer of claim 10, wherein said liquid supply tube comprises a generally flexible tube portion joined with a generally rigid nozzle portion, said nozzle portion comprising said discharge end of said liquid supply tube, and with said tube portion configured to be disposed in said tank and with said nozzle portion protruding into said gas supply tube.

12. The liquid sprayer of claim 8, wherein said liquid supply tube comprises a generally flexible tube portion and a generally rigid nozzle portion, said nozzle portion comprising said discharge end of said liquid supply tube, with said tube portion configured to be disposed in said tank and with said nozzle portion arranged so that the pressurized gas that flows through said gas supply tube flows across said discharge end of said nozzle portion.

13. The liquid sprayer of claim 12, wherein said nozzle portion of said liquid supply tube protrudes into said tip portion.

14. A liquid sprayer for plants comprising:
a wand comprising a gas supply tube for providing a flow of a pressurized gas and a liquid supply tube for providing a flow of a liquid to be sprayed, said gas supply tube having a discharge end and said liquid supply tube having a supply end and a discharge end, said liquid supply tube being disposed exteriorly of said gas supply tube over a majority of the length of said wand with said discharge end of said liquid supply tube projecting into an aperture of said gas supply tube proximate said discharge end of said gas supply tube, and wherein said gas supply tube includes a tip portion adjacent said discharge end of said gas supply tube and a bend in said gas supply tube adjacent said tip portion whereby said tip portion is angled relative to a longitudinal axis of said wand, wherein said discharge end of said liquid supply tube protrudes into said tip portion of said gas supply tube;
a handle attached to said supply end of said gas supply tube, wherein said handle includes a control operatively connected with said gas supply tube with said control configured to selectively enable or prevent the pressurized gas to flow through said gas supply tube;
a tank connected to said wand, said tank configured to hold the liquid to be sprayed with said supply end of said liquid supply tube configured to be disposed in said tank, said tank being movably connected to said wand such that said wand is configured to rotate about a longitudinal axis of said wand relative to said tank;
a bracket, wherein said tank is connected to said wand by said bracket with said bracket being rotatable about a longitudinal axis of said wand;
an extension member connected to said handle opposite from said gas supply tube, and wherein said bracket is connected to said extension member; and
a coupler attached to said extension member opposite said handle, said coupler being configured to be connected to an airline of an air compressor for supplying pressurized gas to said gas supply line;
wherein said discharge end of said gas supply tube and said discharge end of said liquid supply tube are arranged so that the pressurized gas that flows through said gas supply tube flows across said discharge end of said liquid supply tube to thereby draw the liquid through said liquid supply tube into the flow of the pressurized gas.

15. The liquid sprayer of claim 14, wherein said discharge end of said liquid supply tube protrudes into said gas supply tube substantially near said discharge end of said gas supply tube.

16. The liquid sprayer of claim 15, wherein said liquid supply tube comprises a generally flexible tube portion joined with a generally rigid nozzle portion, said nozzle portion comprising said discharge end of said liquid supply tube, and with said tube portion configured to be disposed in said tank and with said nozzle portion protruding into said gas supply tube.

17. The liquid sprayer of claim 14, wherein said liquid supply tube comprises a generally flexible tube portion and a generally rigid nozzle portion, said nozzle portion comprising said discharge end of said liquid supply tube, with said tube portion configured to be disposed in said tank and with said nozzle portion arranged so that the pressurized gas that flows through said gas supply tube flows across said discharge end of said nozzle portion.

18. The liquid sprayer of claim 17, wherein said nozzle portion of said liquid supply tube protrudes into said tip portion.

* * * * *